United States Patent [19]

Bischoff et al.

[11] Patent Number: 5,117,589

[45] Date of Patent: Jun. 2, 1992

[54] ADJUSTABLE TRANSFER TOOL FOR LAPPING MAGNETIC HEAD SLIDERS

[75] Inventors: Peter G. Bischoff, Cupertino; Robert A. Cole, Newark, both of Calif.

[73] Assignee: Read-Rite Corporation, Milpitas, Calif.

[21] Appl. No.: 679,836

[22] Filed: Apr. 1, 1991

Related U.S. Application Data

[62] Division of Ser. No. 495,706, Mar. 19, 1990, abandoned.

[51] Int. Cl.⁵ .............................................. B24B 49/00
[52] U.S. Cl. .................................. 51/216 A; 51/217 A; 269/265; 269/234; 74/89.15
[58] Field of Search ................ 51/216 A, 217 A, 324, 51/277; 269/234-265, 266; 74/89.15, 424.8 A

[56] References Cited

U.S. PATENT DOCUMENTS

| 260,685 | 7/1882 | Inslee | 51/212 |
|---|---|---|---|
| 2,092,372 | 9/1937 | Goeller | 269/234 |
| 2,277,601 | 3/1942 | Morgan | 269/48.1 |
| 3,407,018 | 10/1968 | Miller | 74/89.15 X |
| 4,914,868 | 4/1990 | Church et al. | 51/165.71 |

*Primary Examiner*—M. Rachuba
*Attorney, Agent, or Firm*—N. Kallman

[57] ABSTRACT

An adjustable transfer tool is used to compensate for row bow during lapping a bar or a row of magnetic head sliders. The adjustable transfer tool enables establishing uniform and substantially precise throat heights for a multiplicity of thin film transducers disposed on said sliders. To allow the desired adjustment, the transfer tool incorporates slot means by which the shape of the surface of the tool on which the bar of sliders is mounted can be modified so that the slider transducers assume a collinear array across its entire length for the lapping process. Adjustment is accomplished by manual means, such as by a screw or a tapered pipe plug, or by electrical means, such as a piezoelectric actuator, in conjunction with a computer or microprocessor.

13 Claims, 6 Drawing Sheets

ADJUSTABLE TRANSFER TOOL FOR LAPPING MAGNETIC HEAD SLIDERS

This application is a division of application Ser. No. 07/495,706, filed Mar. 19, 1990, now abandoned.

FIELD OF THE INVENTION

This invention relates to an adjustable transfer tool for lapping magnetic head sliders and in particular to a transfer tool useful for establishing uniform throat height of thin film transducers disposed on the magnetic head sliders.

BACKGROUND OF THE INVENTION

Description of the Prior Art

In presently known disk drives, magnetic head assemblies are employed for coacting with a rotating magnetic disk to record and read data signals. Magnetic head assemblies that fly over the rotating disk at a predetermined head-to-disk spacing generally incorporate slider elements formed with longitudinal rails. The air bearing configuration of the sliders allows an aerodynamic force to be applied to the magnetic head so as to urge the head away from the surface of the rotating disk. A load force provided by a flexure or spring opposes the aerodynamic force and the resultant of the two opposing forces determines the flying height of the magnetic head.

A major objective in disk drive technology is to increase the packing density of the data recorded on the disks. One factor that enables an increase in data density is the length of the transducing gap which is made as small as possible so that short wavelength, high frequency data signals can be recorded. To realize higher frequency recording, thin film transducers are preferably used. Of prime importance in the production of thin film heads is the distance from the apex of the insulation between the pole pieces of the head structure to the end of the transducer located at the lapped surface of the head slider rails. This distance is defined in the industry as the throat height, measured from zero throat height at the apex. It is highly desirable to obtain a predetermined throat height which affords optimum magnetic characteristics for the magnetic head and can be uniformly and repetitively produced. During manufacture of the magnetic head sliders, thin film transducers are deposited in rows on a ceramic substrate. The substrate is then sliced into longitudinal sections or rows, each row having a multiplicity of aligned thin film transducers. Each substrate section or row is separately bonded to a transfer tool, by epoxy for example, and configured into individual sliders with longitudinal rails. A thin film transducer is disposed at the trailing edge of each rail. During slicing of the rows, substantial distance in the order of 0.001 to 0.0022 inches must be maintained between the cutting edge of the saw element and the desired throat of the magnetic transducer to avoid damage to the transducer. The excess material is then removed by fine grinding or preferably by a lapping process. The final predetermined throat height ranges from 40 to 100 microinches depending upon the transducer design. The final predetermined throat height typically has a tolerance of ±20 microinches, with a specified tolerance of ±10 microinches being preferred.

Each row of sliders is lapped by use of a lapping machine with a planetary motion, while they are positioned in alignment on a transfer tool, to establish a predetermined throat height for each transducer. As the lapping machine laps or grinds the slider elements and the pole tip area of the thin film transducers, the throat height of each transducer is progressively reduced. The throat height level is monitored, either by visual means such as a microscope; or by high resistance elements and electrical lapping guides (ELGs) to produce electrical signals for controlling the lapping operation. When the desired throat height is reached, the lapping procedure is halted and the lapped and configured sliders with thin film transducers, each having a predetermined uniform throat height, are removed from the transfer tool by use of a solvent, by way of example.

Figure 1:
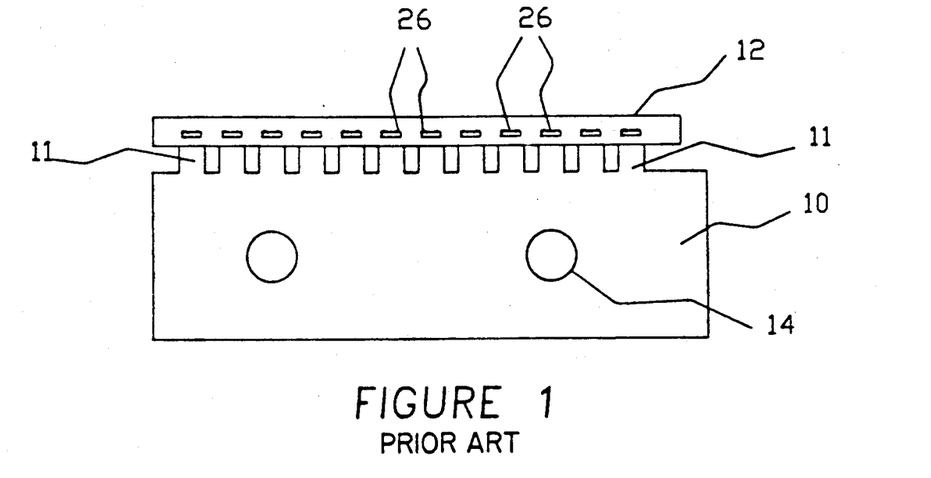
FIG. 1 is a representational view of a prior art transfer tool for processing magnetic head slicers with a bar of sliders and thin film transducers mounted on top.
Figure 2:
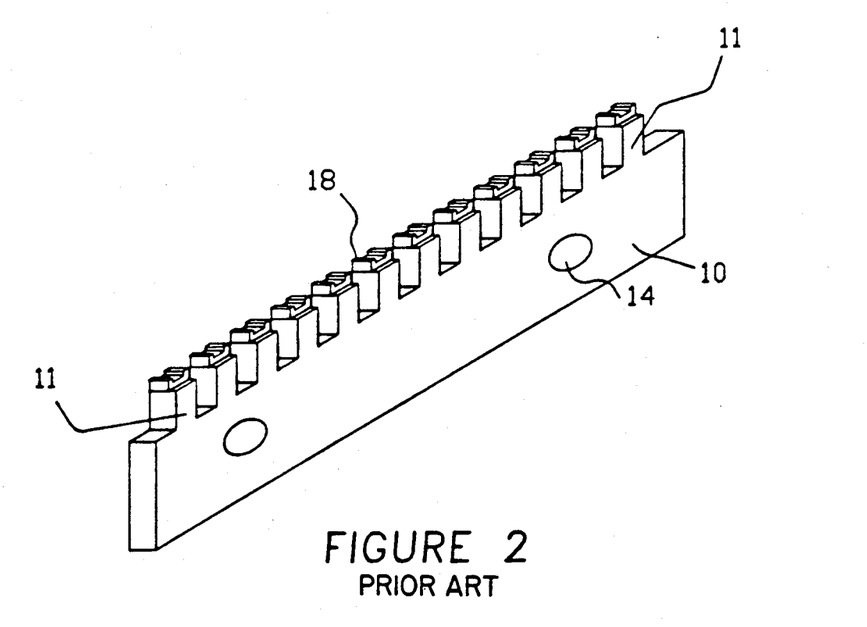
FIG. 2 is an isometric view of a prior art transfer tool showing a row of head sliders which have been lapped and cut.

FIGS. 1 and 2 depict a transfer tool 10 which is widely used in the industry for thin film head fabrication. The tool 10 is made from a rigid metal block, which may be a two inch long stainless steel piece formed with a crenelated configuration of evenly spaced rectangular blocks 11 on a top surface. Apertures 14 are provided for mounting the tool 10 to a plate (not shown) to enable lapping and machining of a slider bar 12 made of a ceramic material. Thin film transducer assemblies 20 and electrical contacts 26 are uniformly spaced on the slider bar 12, as illustrated in the enlarged FIGS. 3A and 3B. During fabrication, the bar 12 which is bonded in place on the top surface of the transfer tool 10, is lapped, sectioned and configured to produce a row of sliders 18.

During the lapping process, there is minimal flexing of the tool body, but as a result of the stress induced in the material of the tool, curvature or bow of the row of sliders occurs. The curvature can be concave or convex, which may be defined respectively as a negative bow or positive bow. To ensure that the sliders are being lapped uniformly so that the throat heights of the thin film transducers are substantially the same, it is necessary to present a collinear array of transducers along the slider bar 12 to the lapping plate.

In addition, the adhesives used during row bonding across the length of the slider bar tend to contract during the lapping process. Therefore it becomes virtually impossible to realize the relatively tight tolerances of ±10 to 20 microinches. The transfer tool presently used in the industry typically obtains throat height tolerances of up to ±60 microinches which does not produce sliders with thin film transducers having optimum throat height and good operating magnetic characteristics.

SUMMARY OF THE INVENTION

An object of this invention is to provide means for effectuating uniform throat heights during production of thin film transducers used with magnetic head assemblies.

Another object of this invention is to provide an adjustable transfer tool which has means for adjusting the configuration of the tool surface, thus allowing an array of transducers on a slider bar to be made collinear to match the surface of a flat lapping plate; or alternatively allowing an array of transducers on a slider bar to be curved to a specific radius to match an almost flat surface of a spherical lapping plate of very large radius.

Another object is to provide means for adjusting the surface geometry of a transfer tool by manual means or by computer control.

According to this invention, an adjustable transfer tool is formed with a slot or recess which can be adjusted in size and shape. The slot or recess can be adjusted by manual, electrical and/or computer means to modify the shape of the crenelated surface of the tool on which a slider bar is mounted for processing and lapping. The slider bar is formed with a row of uniformly spaced similar slider sections that are to be lapped simultaneously. The change in shape of the tool surface compensates for row bow of the slider bar and results in a substantially collinear array of transducers along the slider bar to be presented to the flat or planar lapping plate. In this manner, the thin film transducers of the magnetic head sliders which are aligned in a row can be processed to have substantially the same uniform throat height. Thus the sliders at the ends of the bar are lapped to virtually the same amount as the sliders located at the center of the bar.

One example of an adjustable transfer tool employed in accordance with this invention to effectuate the adjustment for row bow would employ a piezoelectric actuator whereby throat height can be controlled in real time during the lapping operation. Row bow is monitored by using electrical lapping (ELGs) which are built into the sliders. Each of the heads being processed simultaneously on a transfer tool, which may be thirteen in number for example, has a built-in ELG. The ELG is constructed such that, as the head is lapped, a set of conductors is sequentially cut causing the resistance across the ELG to increase in a series of steps. Each step has an exact location with respect to zero throat height.

The ELGs are connected to a computer which determines where the lapped surface is at any time with respect to zero throat. If the heads at the end of the bar are lapped closer to zero throat than the heads in the center, the computer can determine that the bar is bowed concave and can then increase voltage to the piezoelectric actuator, which will adjust the center of the transfer tool and thus lap the center heads closer to zero throat.

BRIEF DESCRIPTION OF THE DRAWING

The invention will be described in greater detail with reference to the drawing in which.

Similar numerals refer to similar elements throughout the drawing. It should be understood that the Figures of the drawing are not necessarily drawn to the same scale.

DETAILED DESCRIPTION OF THE INVENTION

Figure 3A:
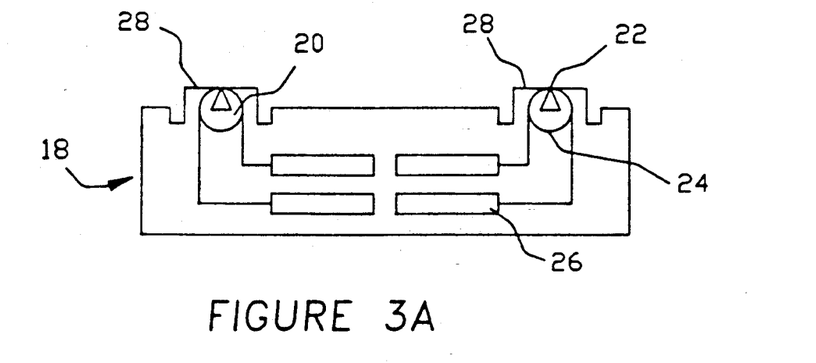
FIG. 3A is a representational view of a completed head slider having thin film magnetic heads disposed at the trailing edges of configured rails.
Figure 3B:
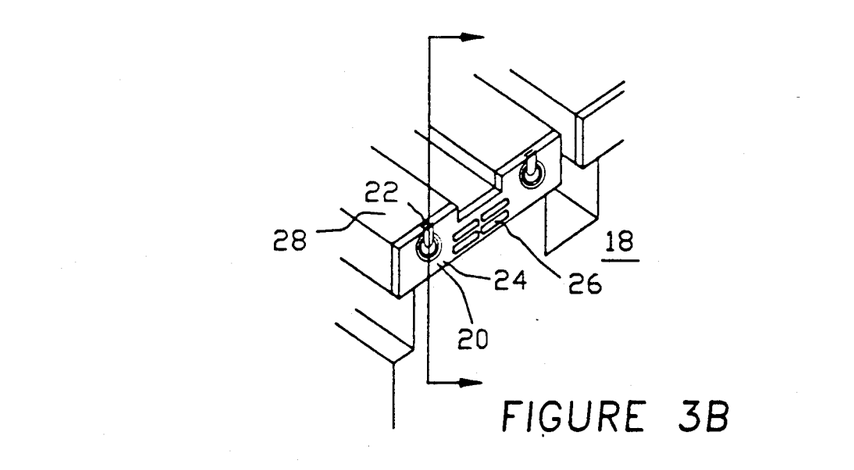
FIG. 3B is a perspective view, partly broken away, of a head slider with two thin film transducers at the trailing edge of the slider.

With reference to FIGS. 3A and 3B, a completed slider 18 is shown that is formed with rails 28 having thin film transducers 20 disposed at the trailing edges of the rails 28. The pole tips 22 of the transducers 20 are located at the lapped surfaces of the rails 28 that face the rotating magnetic disk during operation of a disk drive. Each transducer 20 includes an electrical coil 24 of the pancake type which is coupled to electrical contacts or terminals 26.

Figure 4:
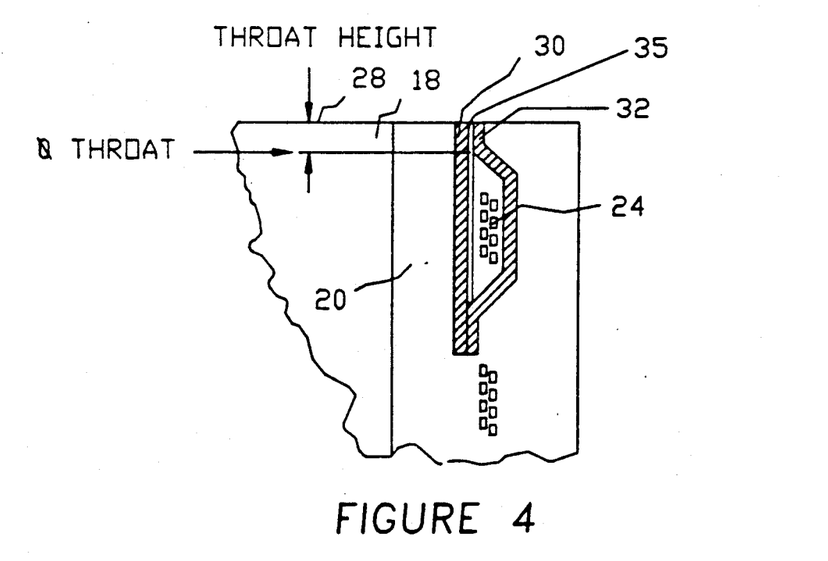
FIG. 4 is an enlarged partial cross-sectional view, illustrating the relation of the pole tips of a thin film transducer to the lapper surface of the head slider and delineating throat height relative to zero throat.

FIG. 4 defines the transducing gap between the pole tips 22 of the P1 pole piece 30 and P2 pole piece 32, which are formed of Permalloy, for example. A layer 35 of nonmagnetic material, such as aluminum oxide, is disposed between the P1 and P2 pole pieces to provide the nonmagnetic transducing gap. To provide an effective magnetic field at the transducing gap, the throat height, which may be about 60 microinches from zero throat for example, needs to be precisely established.

Figure 5:
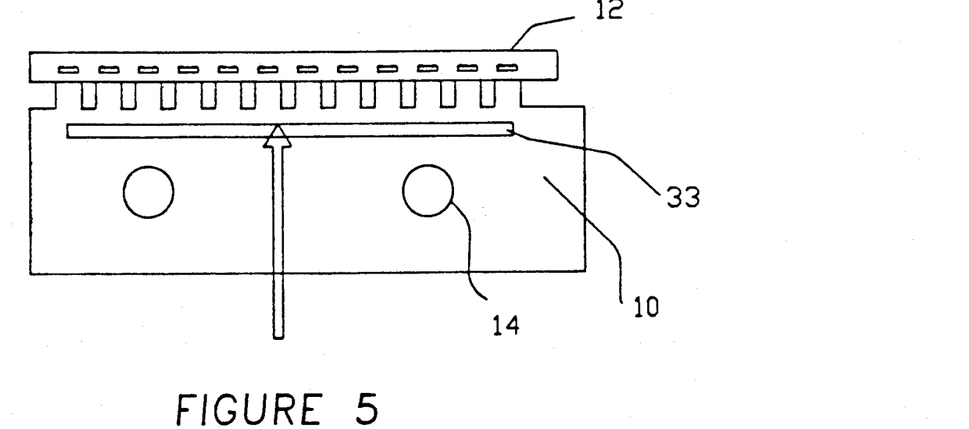
FIG. 5 is a representational view of an adjustable transfer tool including a slot which can be adjusted, in accordance with this invention.
Figure 6:
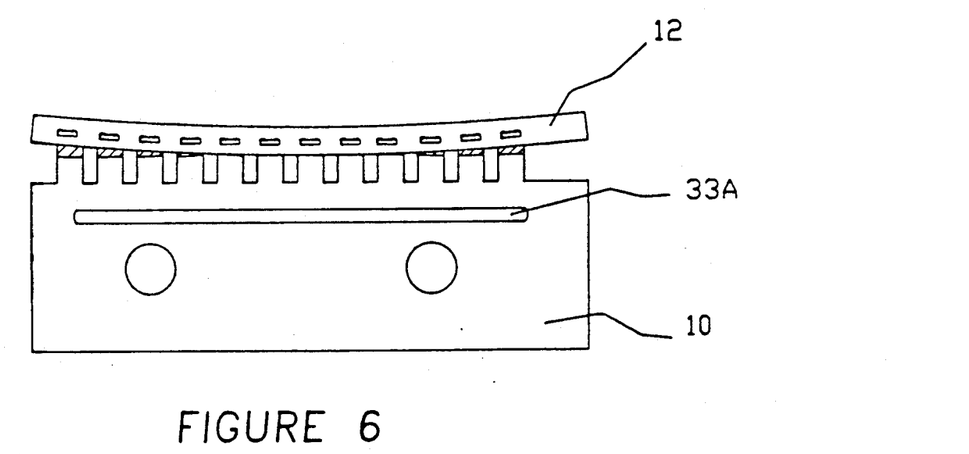
FIG. 6 depicts an adjustable transfer tool having a slider bar characterized by row bow mounted thereto wherein the sliders are not collinear.
Figure 7:
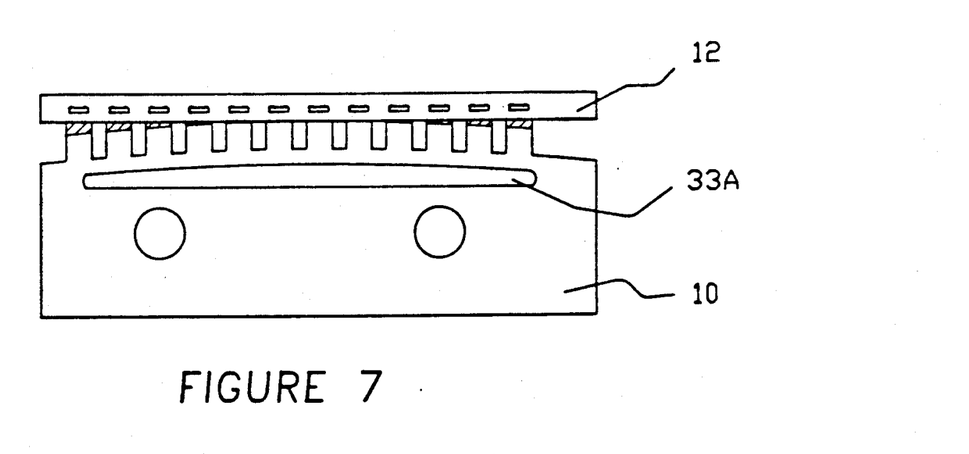
FIG. 7 illustrates the assembly of FIG. 6, depicting the sliders as collinear after adjustment of the slot and slider row, in accordance with this invention.

With reference to FIG. 5, a transfer tool 10 is shown with a longitudinal slot 33 that is used in accordance with this invention to allow modifying the shape of the top surface of the tool 10 and thereby the configuration including the colinearity of the transducers along the slider bar 12. When a slider bar is bonded to a transfer tool it may have a negative bow, for example, as shown in FIG. 6. The transducers are not colllinear and therefore, when they are lapped on a flat plate, the end transducers would be lapped too far, resulting in short throat heights. Thus the center transducers would not be lapped far enough, resulting in relatively long throat heights. To implement this invention, a force which accomplishes a total possible displacement is applied to the inner wall surface at the top and center of the slot 33A. The applied force changes the shape of the slot 33A and causes the upper section of the tool 10 to distend or lift at its center, as depicted in FIG. 7. As a result, the tool now has a positive bow and the slider bar 12 is modified to become substantially flat with the array of transducers substantially collinear for lapping. Adjustable transfer tools made in accordance with this invention are made with a negative bow in the upper surface of about 0.0001 inch, for example. When the transfer tool is used, before bonding a slider bar onto the tool, the actuating mechanism is used to push the upper surface upwards to a flat configuration. After bonding the slider bar to the tool, if the bar is bowed negative, as shown in FIG. 6, the actuating mechanism is used to push the upper surface of the transfer tool further up to a positive bow, thus bringing the bar into linearity, as shown in FIG. 7. Conversely, if after bonding the bar is bowed positive, the actuating mechanism will be relaxed, allowing the transfer tool to relax to the negative bow configuration, causing the center of the slider bar to be pulled down so that the sliders on the slider bar become collinear. In this way all the sliders on the bar will be lapped evenly. It should be understood that during the lapping process, the surface of the slider bar could be continuously adjusted as necessary to correct for any changes in collinearity which may arise from the action of the lapping plate against the slider bar and the slider elements.

Figure 8:
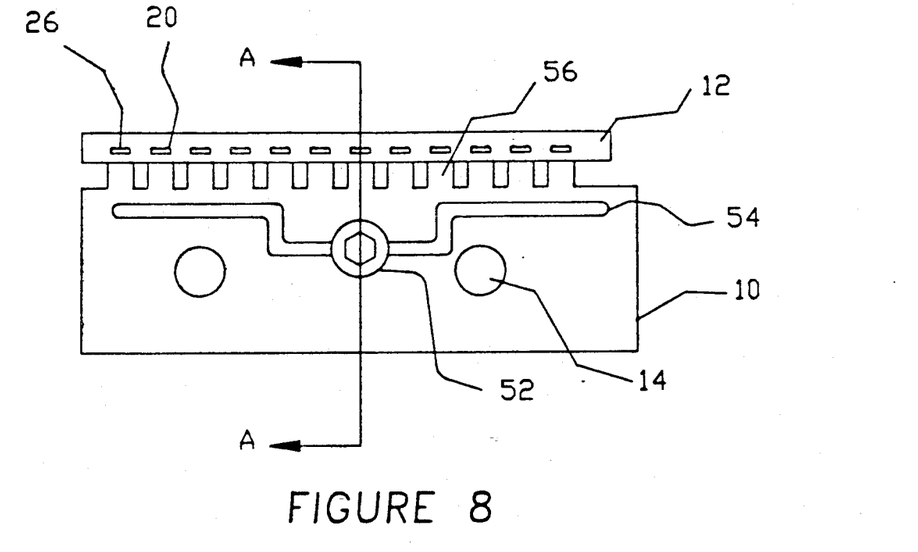
FIG. 8 illustrates an alternative embodiment of an adjustable transfer tool using mechanical means for adjusting for row bow.
Figure 9A:
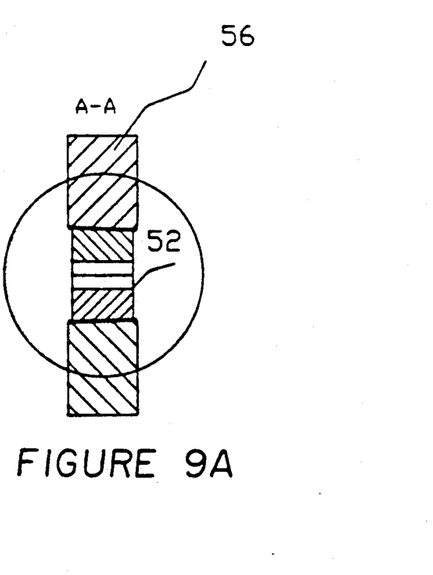
FIGS. 9a and b are sectional views taken through line A—A of FIG. 8 and an enlarged sectional view of the central portion of the mechanical adjustment means.
Figure 9B:
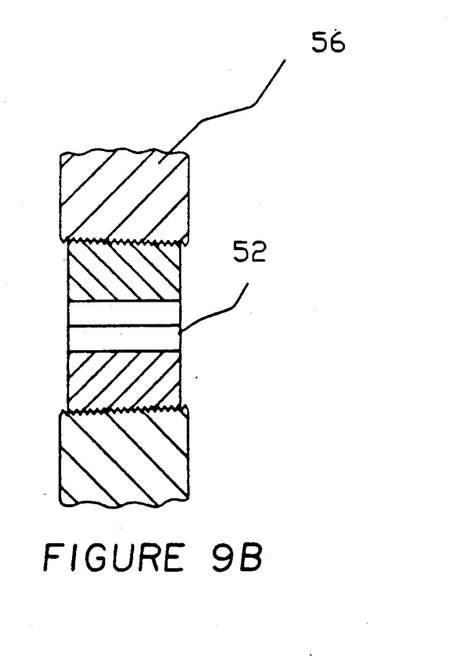

In the embodiment of FIG. 8, a tapered screw 52 and a U-type shaped slot 54 are used to vary the shape of the upper central section of the tool 10. The tapered screw 52 is positioned at the center of the base of the slot 54. As the screw is turned to move inward, the force on the slot wall will wedge the tool apart and move the upper portion 56 of the tool upwardly. Therefore any row bow of the slider bar 12 can be modified so that the transducers of the bar 12 are substantially flat collinear. FIG. 9 is a cross-section taken through line A—A of FIG. 8 and shows the threaded wall structure surrounding the slot 54 to accommodate the screw 52. It was determined that a 2 degree taper on a ¼-80 screw will provide 437 microinches of displacement for each complete revolution of the screw or 1.21 $\mu$in/degree of rotation.

Figure 10:
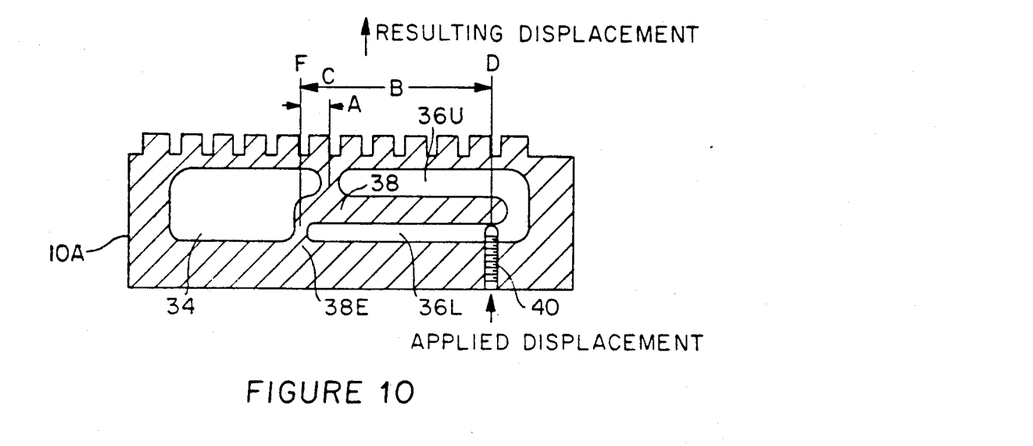
FIG. 10 is a sectional view showing one configuration of a slotted transfer tool with means for adjusting the slot to compensate for row bow and incorporating a lever in order to increase the resolution of the resulting displacement.
Figure 10A:
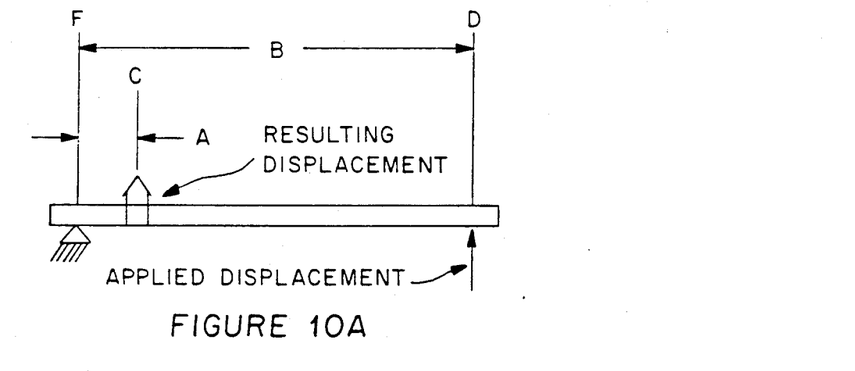
FIG. 10A is a simplified representation of the lever shown in FIG. 10.

Another implementation of the invention, as illustrated in FIG. 10, incorporates a reverse C-shaped slot having lower and upper leg portions 36L and 36U. The slot portions 36L and 36U define a lever 38 therebetween. A threaded aperture extends from the bottom surface of the tool 10A through the lower leg portion 36L to engage a threaded screw 40, which may be a recessed head type screw, that can be advanced or retracted within the aperture. The tip of the screw 40 bears on the lever 38 and moves the lever as the screw is adjusted. The finger 38 acts as a lever with its fulcrum F between the slot 34 and slot 36, as illustrated in the simplified schematic of FIG. 10A. The displacement ratio achieved with the adjustable transfer tool of FIG. 10 is defined as B/A, where B is the distance from the tip of the screw 40 at position D to the fulcrum F, and A is the distance from the finger end 38E to the center C between the slot portion 36U and the projecting part of slot 34. The end portion 38E is connected to the major part of the tool body 10A so that any upward displacement of the finger 38 will result in a corresponding displacement at the center of the bar 12 and the row of sliders.

In one implementation, a 6-80 screw having 80 threads per inch was used, thus providing a movement of 0.0125 inch per revolution or 0.000035 inch per degree of rotation of the screw. In this embodiment, the length A was 0.075 inch and the length B was 0.75 inch. The resulting displacement of the surface is A/B, which equals 10% of the applied displacement of the screw 40 of 0.000035 inch per degree of rotation, whereby a resulting displacement of 0.0000035 inch per degree of rotation of the screw is realized. By this means, small variations in the configuration of the surface can be controllably effectuated by rotation of the screw 40 until a collinear array of transducers is achieved.

Figure 11:
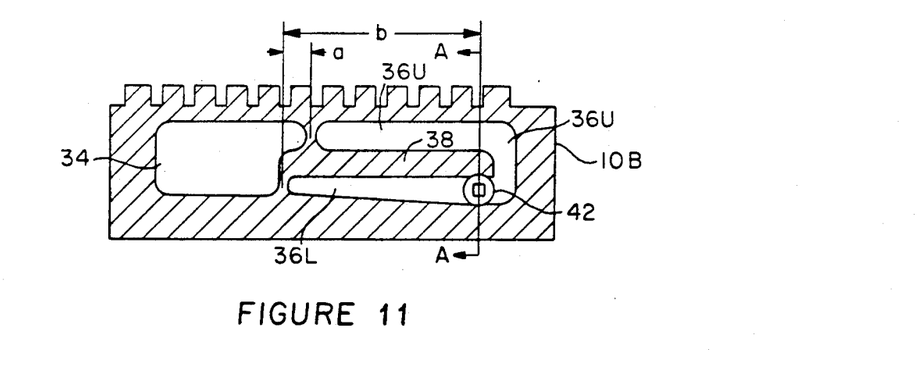
FIG. 11 is a sectional view showing an alternative means for accomplishing adjustment of a slot to compensate for row bow using a lever to increase resolution and a tapered plug to actuate the lever.

With reference to FIG. 11, a tapered pipe plug 42 is used to move the finger or lever 38 in order to provide the desired adjustment to obtain a planar surface for the lapping operation. The tapered pipe plug 42 is inserted within the lower slot portion 36L so that when the pipe plug is advanced within the slot, the finger 38 is moved upward. When the pipe plug 42 is retracted, the finger 38 is relaxed and moves downward. During adjustment, the pipe plug 42 is moved while the array of transducers is under visual inspection, whereby compensation for slider row bow is accomplished and a collinear array of transducers is obtained.

Figure 11A:
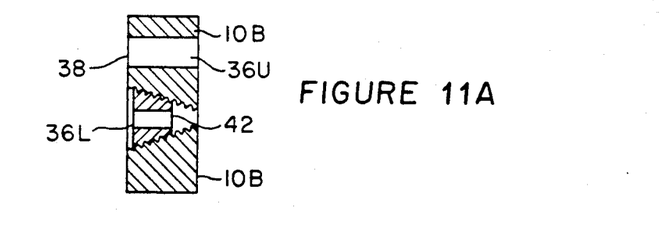
FIG. 11A is an enlarged sectional view taken across line A—A of FIG. 11 illustrating the tapered plug.

In a particular implementation of a transfer tool using a tapered pipe plug 42, such as shown in the cross-section of FIG. 11A taken across line A—A of FIG. 11, the plug had 27 threads per inch with a taper angle of 3.5 degrees. For each revolution, the plug can move forward 0.037 inch. This forward movement of the plug causes an upward displacement of the finger 38 equal to 0.037 tan $\alpha$, where the angle o is the taper angle of the pipe plug. Since the taper angle is 3.5 degrees, the applied displacement is 0.002265 inch per revolution, and the resulting displacement is 0.0000006 inch per degree of rotation of the pipe plug. FIG. 11A illustrates the relation of the tapered pipe plug 42 within the slot portion 36L to the finger 38 and lower tool body 10B.

Figure 12:
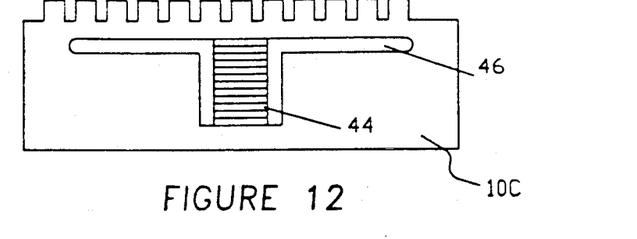
FIG. 12 is an alternative embodiment of an adjustable transfer tool using a piezoelectric actuator.
Figure 13:
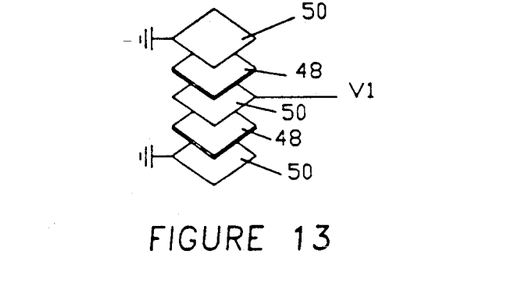
FIG. 13 is an exploded isometric view of a portion of the piezoelectric actuator shown in FIG. 8.

In another embodiment of the invention, illustrated in FIG. 12, electrical means employing a piezoelectric actuator 44 is employed for adjusting the row bow of the surface to be lapped. As depicted in FIG. 12, a transfer tool 10C is configured with a T-shaped slot 46. The piezoelectric actuator 44, which is located within the central portion of the T-slot 46, is formed with a number of piezoelectric crystal layers 48 and interleaved conductive layers 50, as shown in FIG. 13. Alternate conductive layers 50 are connected to ground potential. The piezoelectric assembly can be made to expand upward or contract downward in response to a voltage signal V1 which is derived from a controlled voltage source (not shown) and applied to an ungrounded conductive layer 50.

During the lapping process, a microcomputer receives signals from an electrical lapping guide (ELG) built into each slider of the row bar that is being processed. The ELG is constructed with high resistance elements so that, as the sliders with the thin film heads are lapped, spaced conductive elements are sequentially cut causing the resistance across the ELG to increase in a series of steps. Each step corresponds to a level to which a slider surface has been lapped and to the precise location of the lapped surface relative to zero throat height. In response to the signals received from the ELG, the microcomputer calculates the level of the lapped surface with respect to zero throat. If the slider heads at the end of the bar are lapped closer to zero throat than the heads at the center of the bar, the microcomputer determines that the bar is bowed concave, as illustrated in FIG. 6. In such case, the microcomputer provides an increased voltage to the piezoelectric actuator 44 to expand the actuator and lift the center of the transfer tool 10C. In the case where the microcomputer determines that the bar is bowed convex, as in FIG. 7, the actuator 44 is relaxed to adjust the bow of the surface to be lapped. As a result of the adjustment, the slider heads closer to the center of the slider row bar as well as the slider heads at the ends of the slider bar are lapped to be close to zero throat. The piezoelectric adjustment affords monitoring and controlling throat height in real time during the lapping operation.

Figure 14:
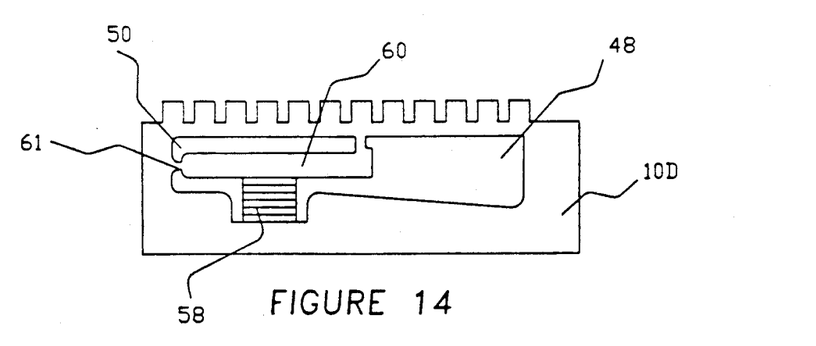
FIG. 14 shows an alternative embodiment using a piezoelectric actuator and having a different slot configuration, using a lever to increase displacement.
Figure 14A:
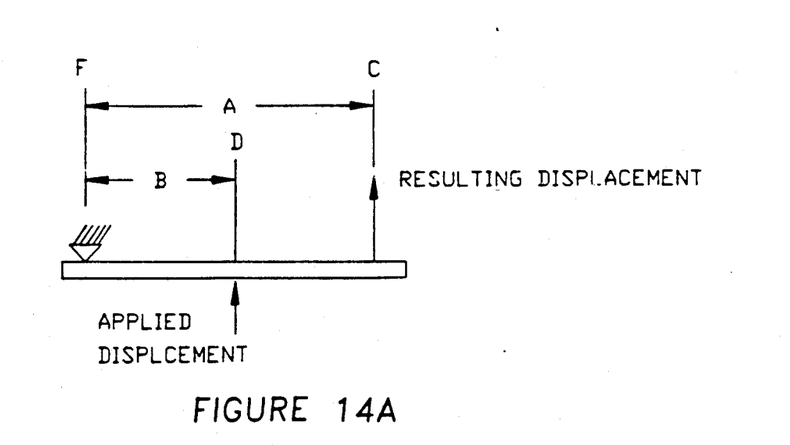
FIG. 14A is a simplified representation of the lever in FIG. 14.

FIG. 14 presents an alternative design of an adjustable transfer tool 10D which incorporates a piezoelectric actuator 58 for providing an adjustment of the surface geometry of the transfer tool. The tool 10D is formed with two shaped slots 48 and 50 having a portion 60 of the tool body forming a lever with fulcrum at point 61 therebetween. The movement of the actuator 58 between the upper and lower walls of the slot 48 causes a corresponding movement of the lever portion 60 which in turn raises or lowers the top central portion of the tool. The purpose of the lever 60 is to magnify the displacement applied by the piezoelectric actuator, thus allowing a smaller actuator or a lower voltage to be used. A schematic of the lever is shown in FIG. 14A. The magnification provided by the lever is equal to the ratio of the lengths A/B. As described with reference to FIG. 12, the piezoelectric actuator 58 can be controlled by an applied voltage to effectuate the desired displacement which would result in a substantially flat surface of a slider bar to be lapped.

By virtue of the adjustable transfer tool using manual or electrical adjustment means, or a combination of both, adjustment for row bow associated with the manufacture of magnetic head sliders can be made expediently so that uniform throat heights are produced for a number of head sliders that are lapped while bonded to the adjustable transfer tool.

It should be understood that the invention is not limited to the specific configurations, parameters, materials or dimensions set forth above but may be modified within the scope of the invention disclosed and claimed herein.

What is claimed is:

1. An adjustable transfer tool for lapping magnetic head sliders on which thin film transducers are deposited comprising:
   a tool body for supporting a bar of material from which said magnetic head sliders are to be configured, each of said sliders having at least one transducer disposed thereon, said transducers having a transducing gap at a surface to be lapped;
   said tool body being formed with first, second and third sections, said first section having a top surface for accommodating a magnetic head slider bar;
   a substantially U-shaped slot formed between said sections, one leg of such slot being disposed between the bottom of said first section and the top of said second section, and a second leg of said slot being disposed between the bottom of said second section and the top of said third section, and a base connecting said legs disposed between said first and third sections;
   said second section configured substantially as a finger disposed between the legs of said U-shaped slot, said second section having a free end in juxtaposition to said base, a first body part at the other end of such second section for connecting said second section approximately to the center of said first section, a second body part connecting other end of said second section to a point on said third section displaced from the center of said third section;
   adjustment means for applying a displacement force at said free end of said second section so that second section operates as a lever for adjusting the curvature of said top surface of said first body section and for correcting for row bow of said head slider bar so that the throat height of said transducers are effectively controlled to very close tolerances.

2. An adjustable transfer tool as in claim 1, wherein said adjustment means is a threaded screw passing through said third section and bearing against said second section for controllably rotating said second lever section.

3. An adjustable transfer tool as in claim 2, wherein the displacement provided by said threaded screw is approximately 0.0000035 inch per degree of rotation.

4. An adjustable transfer tool as in claim 1, wherein said adjustment means is a movable tapered pipe plug disposed within said second leg of said slot and between said second and third sections for controllably rotating said second section.

5. An adjustable transfer tool as in claim 4, wherein the displacement provided by said pipe plug is approximately 0.0000006 inch per degree of rotation of said pipe plug.

6. An adjustable transfer tool as in claim 1, further including a second slot formed between said first and third sections adjacent to said other end of said second section, wherein said second section acts as a lever with its fulcrum between said U-shaped slot and said second slot.

7. An adjustable transfer tool as in claim 1, wherein said adjustable means provides an applied force which results in an upward displacement of said lever with a corresponding downward displacement substantially at the center of the magnetic head slider bar.

8. An adjustable transfer tool useful for lapping magnetic head sliders on which thin film transducers are deposited comprising:
   a tool body for supporting a bar of material from which magnetic head sliders are to be configured, each of said sliders having at least one transducer disposed thereon, said transducers having a magnetic gap at a surface to be lapped;
   a configured slot formed in said body;
   means for varying the configuration of said slot and the contour of said surface so that said surface is adjusted to cause the array of sliders and transducers thereon to become collinear during lapping whereby the throat height of said transducers is effectively controlled to be substantially uniform, wherein said adjustment means is a piezoelectric actuator.

9. An adjustable transfer tool as in claim 8, wherein said slot means comprises a T-shaped slot in which said actuator is positioned.

10. An adjustable transfer tool as in claim 8, including means coupled to said actuator for providing voltage signals to said actuator to vary the height of said actuator.

11. An adjustable transfer tool as in claim 8, wherein said actuator comprises a plurality of alternating piezoelectric crystal layers and conductive layers.

12. An adjustable transfer tool as in claim 11, wherein alternate one of said conductive layers are coupled to ground potential.

13. An adjustable transfer tool as in claim 12, wherein said piezoelectric actuator operates through an intermediate lever for increasing the resultant displacement.

* * * * *